United States Patent [19]

Billington et al.

[11] 4,099,551
[45] Jul. 11, 1978

[54] THERMAL-MANUAL CONTROL VALVE

[75] Inventors: Evans R. Billington, Glenview; William Nicholas, Chicago, both of Ill.

[73] Assignee: Golconda Corporation, Chicago, Ill.

[21] Appl. No.: 708,128

[22] Filed: Jul. 23, 1976

[51] Int. Cl.² .................. F16K 17/38; F16K 31/46; F16K 31/56
[52] U.S. Cl. ....................... 141/388; 137/73; 137/77; 141/209; 251/75; 251/116; 251/294
[58] Field of Search .................. 251/75, 279–280, 251/289, 294, 298, 303; 137/39, 72–77, 344, 351; 222/52; 141/388

[56] References Cited

U.S. PATENT DOCUMENTS

| 1,304,519 | 5/1919 | Walker | 251/75 |
| 1,614,117 | 1/1927 | Geldhof | 251/298 X |
| 2,004,717 | 6/1935 | Thwaits | 137/77 |
| 2,165,640 | 7/1939 | Marx | 137/344 X |
| 2,533,640 | 12/1950 | Ulrich | 137/351 X |

Primary Examiner—Martin P. Schwadron
Assistant Examiner—Richard Gerard
Attorney, Agent, or Firm—Watson D. Harbaugh

[57] ABSTRACT

A multi-function safety service valve operable both manually and automatically through a toggle fuse-linked joint as located to interconnect the piping of an LP Gas bulk storage tank and a flexible hose connected to fill an LP Gas transport tank on a truck.

10 Claims, 6 Drawing Figures

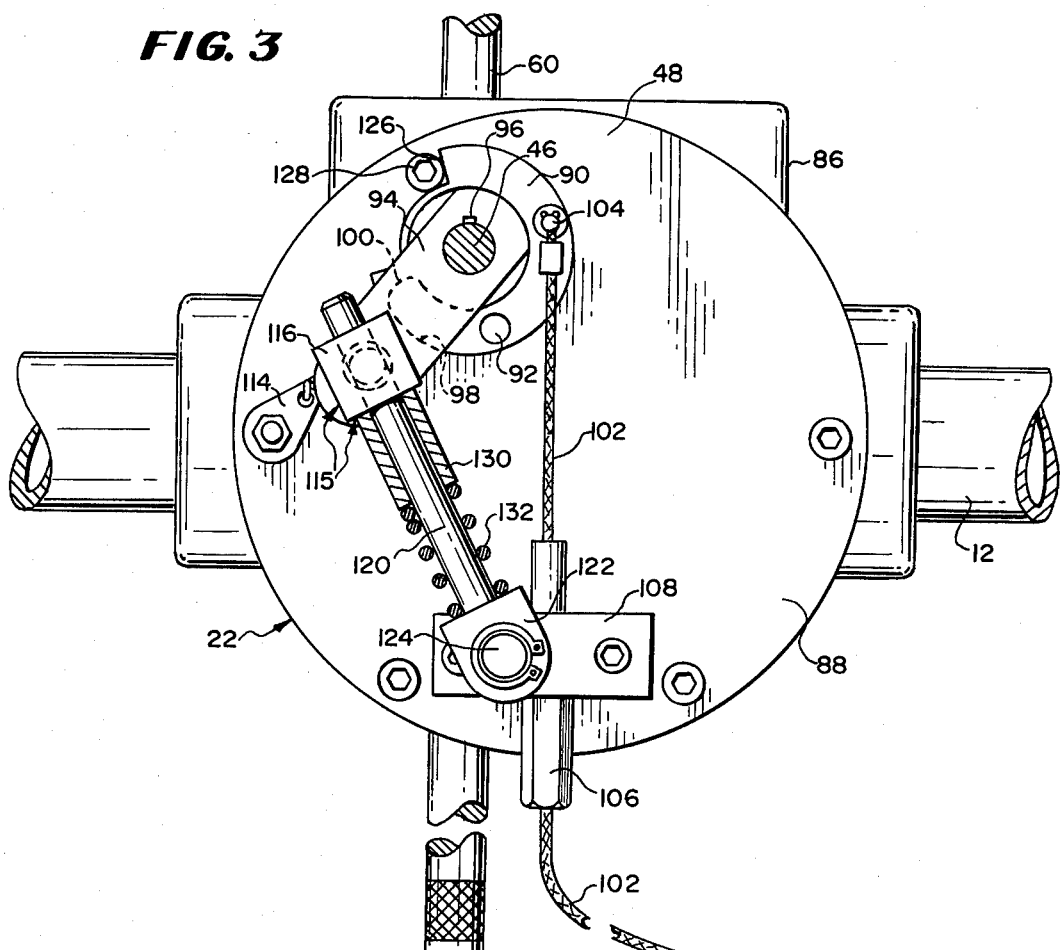

THERMAL-MANUAL CONTROL VALVE

BACKGROUND OF THE INVENTION

Due to human error, an LP Gas transport truck when loaded sometimes is pulled away from the bulk loading station without shutting off the service valve or disconnecting the filler hose. This, along with other mishaps in the loading area may cause rupture and damage to the hose that drops the pressure in the hose to atmospheric pressure and permits LP Gas to flow as liquid through the piping and hose and vaporize inside the piping and hose and be released in the surrounding area. The hazards created of causing fires, destruction of property, personal injury and loss of fluid are great.

While fusible materials and springs have been used heretofore for initiating the closure of valves under dangerous circumstance, it is highly desirable that the manual control valve, as a single readily replaceable or serviceable unit, serve automatically as a shut-off dispensing valve as well as a flow control valve when a downstream conduit rupture develops whether the driver disconnects the hose first or drives away without valve shut-off and hose disconnection.

SUMMARY OF THE INVENTION

The inlet of the normally manually controlled valve embodying the invention as herein described is secured to the dispensing terminal or terminals of the bulk plant piping to serve as the outlet connection to which transfer hoses are attached, permanently or from time to time for filing LP Gas transport truck tanks.

The valve may be closed immediately by 90° movement of the handle; remotely just as quickly by lanyards or flexible and frangible cables which may be terminally located strategically beyond the spread of possible fire including one for securement to the transport; and closure may be automatically initiated by the melting of fuse metal.

The valve preferably has an over-center swing arm and, by way of example for these purposes, has a spring and fuse metal sleeve carried in tandem on a pin pivoted at one end to the valve body and telescopes at the other end in a pivotal eyelet on the swing arm which provides an over-center pivotal toggle joint relation that tends to hold the valve in either an open or a closed position with a differing compression on the spring.

A chamber in the upstream wall of the housing behind the flapper valve partially receives the flapper valve therein in its open position and permits liquefied gas to flow against and expand behind the valve to assist the valve in closing in event the fuse metal sleeve is melted by heat, and particularly when the spring and fuse metal sleeve are no longer able to hold the valve open to operate as a flapper flow check valve until it is repaired and restored to its safety-oriented condition.

Thus, when the fuse metal is melted, the valve serves as an excess flow check valve but is a non-usable valve until it is repaired and restored to its safety-oriented usefulness, but if attended, can be opened by the handle and held by hand if necessity requires.

BRIEF DESCRIPTION OF THE DRAWINGS

FIG. 3 is a side elevational view of the valve with the elements in their "closed" positions;

FIG. 4 is a longitudinal sectional view through the valve chamber with the valve shown in closed position and in broken lines in its open position as shown in FIGS. 2 and 3, respectively.

DESCRIPTION OF THE PREFERRED EMBODIMENT

Figure 1:
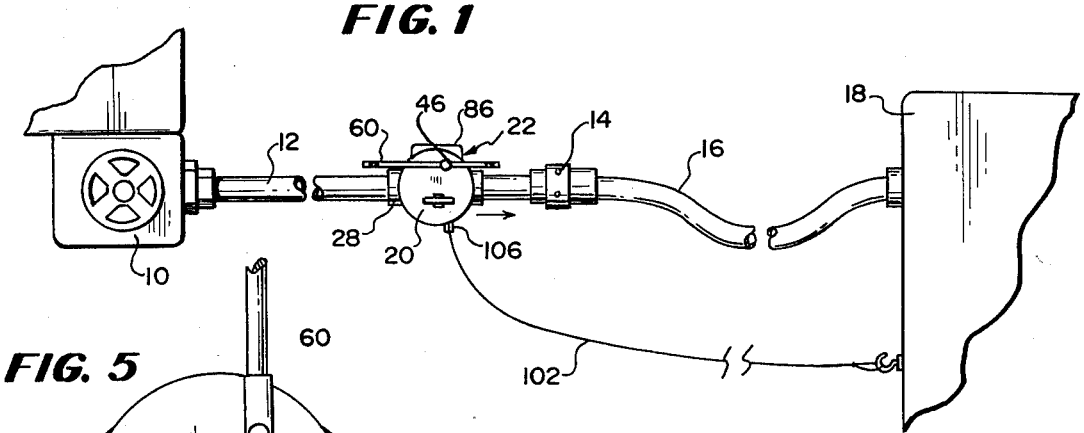
FIG. 1 is a plan view of an LP Gas transport truck being filled from a storage system through a valve embodying the invention interconnecting a service pipe and a filler hose.
Figure 2:
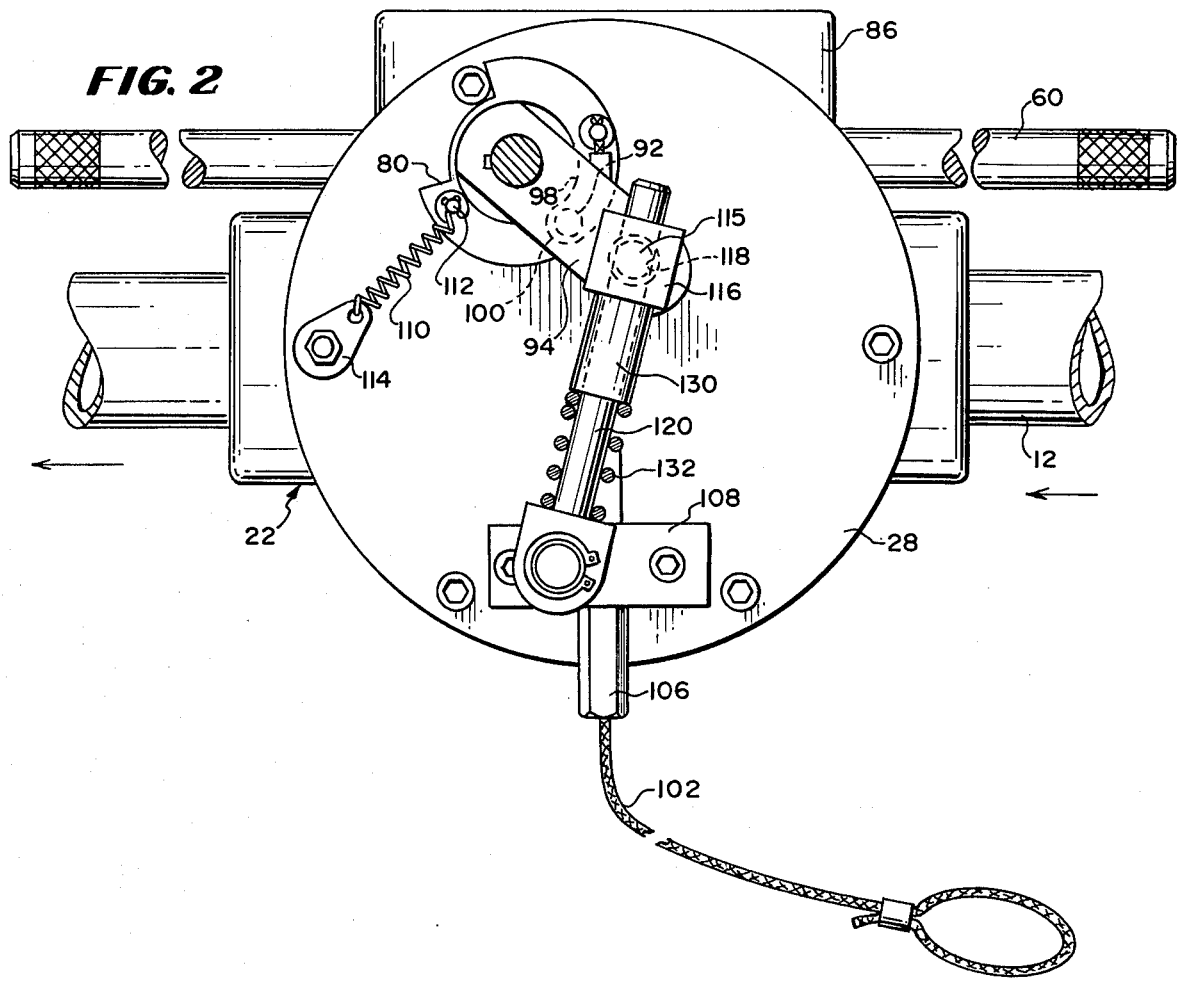
FIG. 2 is a side elevational view of the structure and arrangement of the elements controlling the "open" position of the filler valve during a filling operation.

Referring to FIG. 1, a bulk storage tank of liquefied petroleum gas under pressure is illustrated at 10. The gas in its liquid phase is withdrawn through a rigid liquid dispensing pipe system 12 connected to the tank 10 through a main or primary valve 11. Flow from the pipe system is through a valve 20 embodying the invention. The outlet of the valve 20 is releasably connected by a manually releasable coupling 14 and flexible hose 16 to a transport tank 18. The valve is in its open-flow position with a safety wire 102 later described interconnecting the valve and a hook 21 carried by the truck. In FIGS. 1 and 2 arrows indicate the direction of flow with the valve open. In FIGS. 3 and 4 the control is shown with the valve closed.

The body 22 of the filler control body has a somewhat cylindrical portion 24 defining a valve compartment 26, one internally threaded boss 28 having an inlet passage 30, and another threaded boss 32 opposite thereof defining an outlet valve port 34 at the entrance of an outlet conduit 36. A flapper valve 38 is shown in full lines in its closed contact with the outlet port 34 and is supported at one side thereof on a square section 44 of a control shaft 46 journaled in part on the wall 48 for movement to and away from its closed position.

The valve itself comprises a resilient seat disk 40 which is held on the arm 42 by means of a metal disk 50, a screw 52 which passes through the backup plate 54 and receives a nut 56 for retention. As shown, the flapper assembly is in the closed position. At the top of arm 42 are two hubs having square holes 58 which join with the square sections 44 of the shaft 46. When shaft 46 is rotated 90° by means of the handle 60, the flapper assembly moves away from the seat 34 to the position shown in dotted line 82. In this position the valve provides a full flow with no restriction to the flow of LP Gas.

The side of the valve compartment gravitationally above the valve is recessed by a wall 86 to provide a cavity or chamber 84 into which, with approximately 90° movement, the flapper valve 38 can enter partially in its open position. Thus, when permitted to do so, the valve can move to its closed position or be impelled to do so when an excessively flowing stream of liquid enters and circulates in the chamber 84 and presses downwardly on the upstream face of the open valve, or when high heat is present, or both, and liquefied gas vaporizes and expands as a levitated gas volume against the upstream face of the valve.

Sealing the valve compartment as shown in FIGS. 2 and 3 is a circular plate 88 (cut away in FIG. 4) which journals the remote end of the shaft 46, the near end of the shaft being journaled in the body 22 and receiving the handle in interdrive relationship.

The near end of the shaft journals a trip cam 90 thereon carrying a pin 92 and is held in place by a crank arm 94 that is in turn secured to the shaft 46 in interdrive relation by the key 96. The remote side of the crank arm has an arcuate slot 98 or groove in it having a stop 100 to be engaged by the pin 92 when the valve is in open position.

The trip cam 90 is provided with a lanyard 102 secured by a pin 104 with the lanyard passing through a ferrule 106 disposed in a direction tangential thereto as held by a bracket 108 as shown so that remote closure of the valve can be accomplished from several remote locations of wide latitude to provide a universal installation of the equipment, it being primarily provided for securement to the service truck tank 18 being filled just in case it is driven away or moved in any way damaging the dispensing hose 16. A spring 110 (FIG. 2) interconnecting a pin 112 on the trip cam and a swivel 114 on the plate returns the trip cam to a resting position when free to do so as when the lanyard is relieved.

Thus, when the trip cam is actuated by pulling the lanyard 102, the pin 92 engages the stop 100 and forces the crank arm 94 to move the valve 34 towards its closed position with a minimized effort reflected by the radius of the drive for that purpose.

The valve control mechanism is illustrated in FIG. 3 where the handle 60 for actuating the shaft 46 is shown crosswise the axes of the inlet pipe 30 to indicate the closed condition of the valve, while in FIG. 2 the valve mechanism is illustrated in open position.

The crank arm 94 carries a swivel stud 115 on its free end which has a square boss 116 with a hole 118 and bushing therein through which a shank 120 slides at one end whose other end has a boss 122 pivotally mounted by a stud 124 forming a part of the bracket 108 which holds the lanyard guide to the plate 88. This arrangement provides a toggle joint operative with approximately 90° of full movement as actuated by the crank that is limited, the pin-stop 92 engagement and a stop 126 on the cam 90 engaging one of the bolts at 128 in one direction, and the closure of the valve in the opposite direction. In this relationship a slight tap on the arm in the open position will close the valve sharply.

A cylindrical fuse element 130 and compression spring 132 are mounted in tandem between the margins of the boss 122 and the swivel stud 115. The spring is only strong enough to keep the flapper valve 38 up in normal operations while urging it to hold a closed position in its closed position. Both the spring 132 and fuse metal 130 elements are located outside the housing 88 where they are subject immediately to environmental conditions and with movement of the valve towards its closed position once the toggle is moved in that direction, a mild extra flow pressure upon the valve will operate to close the valve.

In the event the fuse metal melts at approximately 165° F. the force on the spring 132 is relieved to where it cannot hold the valve open against gravity and the flow of the LP Gas impinging on the flapper element will sharply close the valve.

It is desirable to provide manually releasable means for holding the handle in its closed position. Not only does it resolve questions of accidental or intentional opening from its closed position but it latches the handle when the valve is automatically closed and prevents a flutter type of action of the valve which has been referred to upon occasion as rebound, hammering or hunting which has many undesirable side effects including seat deterioration since the spring 132 as a matter of design does not hold the valve closed under stress if the fuse element 130 is melted.

Figure 5:
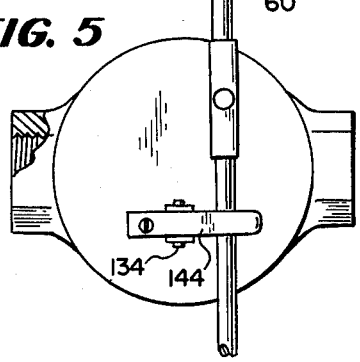
FIGS. 5 and 5A are fragmentary views illustrating a manually released snap latch provided on the handle side of the valve body.
Figure 5A:
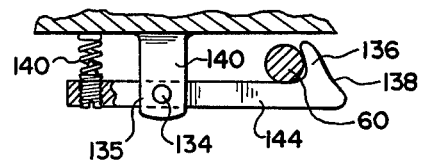

Accordingly, a carrier post 140 is shown in FIG. 5 secured to the handle side of the valve body 22 and has a yoke 135 pivotally mounting at 134 an arm which has a hook element 136 and cam lift 138. A compression spring 140 urges the hook 136 to latch the arm 60 when in its valve-closed position. The cam 138 can be lifted manually to release the arm 60.

What is claimed is:

1. In a liquefied petroleum gas storage and supply system, a liquid transfer valve comprising a housing having a fluid inlet to a valve compartment with a space in an upper side thereof and an outlet valve seat opening below said space, a valve member including a shaft journaled in said housing above said valve seat for approximately 90° movement of the valve member between said space when open and said seat for closing the valve under gravity when free to do so in the direction of flow of fluid from said space through the seat;

toggle joint means interconnecting said shaft and housing including a crank linkage non-rotatively engaging the shaft and a second linkage including in tandem a fusible link element and a resilient member under stress normally urging said valve to maintain alternatively open and closed valving positions;

a first pivot means supporting one end of the second linkage upon the housing;

a second pivot means interconnecting the other end of the second linkage to the crank linkage; and one of said pivot means including a pivotal member slidably engaging one of said linkages.

2. The liquid transfer valve defined in claim 1 in which said toggle joint means includes a cam member and a frangible cord for moving the crank linkage in valve closing direction.

3. The liquid transfer valve defined in claim 1 in which said toggle joint means includes a handle movable between two alternate positions connected to one of the linkages.

4. The liquid transfer valve defined in claim 1 in which said fusible link element and resilient member includes a compression spring and fuse metal in series relation for holding said valve and toggle joint means in open position under spring compression.

5. The liquid transfer valve defined in claim 4 including means for closing said valve, said compression spring sustaining closure of the valve under hydraulic pressure on the valve itself.

6. The liquid transfer valve defined in claim 4 including means for closing said valve, said compression spring and fuse metal being disposed in tandem relation for holding said valve and toggle joint means in closed position under spring compression.

7. In a liquefied petroleum gas storage and supply system, a liquid transfer valve comprising;

a housing having an inlet opening to a valve compartment with a space in an upper side thereof and an outlet valve seat opening below said space;

a valve member including a shaft journaled in said housing above said valve seat for supporting the valve member for movement of the valve from said space to said seat for closing the valve seat under gravity in the direction of flow through the seat when free to do so;

trip cam means pivotally mounted on said shaft carrying a pin to actuate said valve;

lanyard means for actuating said cam means;

toggle joint means interconnecting said shaft and housing including a crank linkage having means actuated by said cam means and non-rotatively engaging the shaft for actuating the toggle joint means;

said toggle joint means including toggle joint members and a fusible link element and a resilient member under stress in tandem normally urging the juncture of the toggle joint members from their aligned positions in the direction of any movement misaligning them to maintain the valve alternatively in open or closed valving position.

8. A bulk storage tank for LP Gas having a manually controlled liquid eduction valve means connected to a transport truck tank by a flexible hose and a manually disengageable conduit coupling between the flexible hose and the valve seat of the valve means;

a valve in said valve means closing said seat in the direction of outflow from the bulk storage tank through the valve seat;

toggle joint means for holding the valve alternatively open and closed;

means for actuating said toggle joint means to release the valve for it to close including a frangible lanyard connected to said transport truck tank.

9. A bulk storage tank for LP GAs having a manually controlled liquid eduction valve means connectible to a transport truck comprising;

means for conveying liquefied gas in its liquid phase including a manually disengageable conduit coupling;

a valve in said valve means closing in the direction of outflow from the bulk storage tank;

a toggle fuse-linked joint for holding the valve alternately open and closed and freeing the valve to close when melted;

a space above the valve when open into which liquid can flow and exert a closing force against the valve under continuing liquid flow from the bulk storage tank when said fuse-link melts while the valve is open; and manually actuated means for moving the toggle fuse-link joint to its valve open position.

10. The system defined in claim 9 including a handle movable between two alternate positions for opening and closing said valve means; and manually releasable latch means for engaging and holding the handle in valve closed position when the fuse link melts.

* * * * *